US012177429B2

(12) United States Patent
Miyauchi

(10) Patent No.: US 12,177,429 B2
(45) Date of Patent: Dec. 24, 2024

(54) DIVISION PATTERN DETERMINING APPARATUS AND LEARNING APPARATUS AND METHOD FOR CONTROLLING SAME AND NON-TRANSITORY COMPUTER-READABLE STORAGE MEDIUM

(71) Applicant: CANON KABUSHIKI KAISHA, Tokyo (JP)

(72) Inventor: Dai Miyauchi, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 901 days.

(21) Appl. No.: 17/201,126

(22) Filed: Mar. 15, 2021

(65) Prior Publication Data

US 2021/0297665 A1 Sep. 23, 2021

(30) Foreign Application Priority Data

Mar. 17, 2020 (JP) ................ 2020-046841

(51) Int. Cl.
*G06N 3/04* (2023.01)
*G06N 3/08* (2023.01)
*H04N 19/107* (2014.01)
*H04N 19/119* (2014.01)
*H04N 19/176* (2014.01)
*H04N 19/42* (2014.01)

(52) U.S. Cl.
CPC ........... *H04N 19/119* (2014.11); *G06N 3/04* (2013.01); *G06N 3/08* (2013.01); *H04N 19/107* (2014.11); *H04N 19/176* (2014.11); *H04N 19/42* (2014.11)

(58) Field of Classification Search
CPC .. H04N 19/119; H04N 19/107; H04N 19/176; H04N 19/42; G06N 3/04; G06N 3/08
See application file for complete search history.

(56) References Cited

U.S. PATENT DOCUMENTS

| 10,771,807 B1* | 9/2020 | Ulaganathan ........... G06F 17/15 |
| 2002/0122596 A1* | 9/2002 | Bradshaw ........... G06F 16/5838 |
| | | 707/E17.023 |
| 2003/0235341 A1* | 12/2003 | Gokturk ................. G06T 9/001 |
| | | 382/173 |

(Continued)

FOREIGN PATENT DOCUMENTS

JP 2018-182531 A 11/2018

*Primary Examiner* — Solomon G Bezuayehu
(74) *Attorney, Agent, or Firm* — Cowan, Liebowitz & Latman, P.C.

(57) ABSTRACT

This invention provides a division pattern determining apparatus for determining a division pattern for dividing a region to be encoded in image data using a neural network, comprising: a determining portion configured to execute on the image data of the region to be encoded a determination for a plurality of blocks of different sizes whether or not to divide each block using a neural network and determine a division pattern of one or more blocks included in the region to be encoded on the basis of the determination, wherein the neural network of the determining portion is constituted by a plurality of layers; and wherein when a size of a block for which whether or not to divide is to be determined is large, information from an intermediate layer positioned in an upper position is used.

11 Claims, 11 Drawing Sheets

(56) References Cited

U.S. PATENT DOCUMENTS

| | | | | |
|---|---|---|---|---|
| 2007/0220404 | A1* | 9/2007 | Terui | H03M 13/356 |
| | | | | 714/774 |
| 2013/0259126 | A1* | 10/2013 | Song | H04N 19/96 |
| | | | | 375/240.12 |
| 2014/0009597 | A1* | 1/2014 | Abe | G06V 20/693 |
| | | | | 348/80 |
| 2014/0010469 | A1* | 1/2014 | Yuan | H04N 19/176 |
| | | | | 382/233 |
| 2016/0065959 | A1* | 3/2016 | Stobaugh | H04N 19/14 |
| | | | | 375/240.26 |
| 2017/0337711 | A1* | 11/2017 | Ratner | H04N 19/119 |
| 2017/0372165 | A1* | 12/2017 | Jouhikainen | G06V 10/70 |
| 2018/0227585 | A1* | 8/2018 | Wang | H04N 19/136 |
| 2018/0247164 | A1* | 8/2018 | Yao | G06T 1/60 |
| 2019/0139213 | A1* | 5/2019 | Kurita | G06F 18/214 |
| 2019/0205700 | A1* | 7/2019 | Gueguen | G06T 3/40 |
| 2019/0385307 | A1* | 12/2019 | Yaqub | G06V 30/2504 |
| 2020/0092552 | A1* | 3/2020 | Coelho | H04N 19/147 |
| 2020/0092556 | A1* | 3/2020 | Coelho | H04N 19/124 |
| 2020/0175375 | A1* | 6/2020 | Chen | G06N 3/045 |
| 2020/0272864 | A1* | 8/2020 | Faust | G06V 10/764 |
| 2020/0320711 | A1* | 10/2020 | Song | G06T 7/0012 |
| 2020/0344474 | A1* | 10/2020 | Leleannec | H04N 19/105 |
| 2021/0103793 | A1* | 4/2021 | Huang | G06N 3/045 |
| 2021/0136371 | A1* | 5/2021 | Galpin | H04N 19/137 |
| 2021/0144190 | A1* | 5/2021 | Amirpour | H04N 19/179 |
| 2021/0150767 | A1* | 5/2021 | Ikai | G06N 3/045 |
| 2021/0168405 | A1* | 6/2021 | Hsiao | H04N 19/70 |
| 2021/0195187 | A1* | 6/2021 | Leleannec | H04N 19/147 |
| 2021/0368173 | A1* | 11/2021 | Taquet | H04N 19/46 |
| 2022/0086360 | A1* | 3/2022 | Deng | H04N 5/2621 |
| 2022/0094928 | A1* | 3/2022 | Amirpour | H04N 19/436 |

* cited by examiner

OUTPUT RELATED TO WHETHER OR NOT TO DIVIDE 16 × 16 BLOCK IS fc16[i][j] (i=0,1,...,15)
(j=0,1)

OUTPUT RELATED TO WHETHER OR NOT TO DIVIDE 32 × 32 BLOCK IS fc32[i][j] (i=0,1,2,3)
(j=0,1)

OUTPUT RELATED TO WHETHER OR NOT TO DIVIDE 64 × 64 BLOCK IS fc64[i][j] (i=0)
(j=0,1)

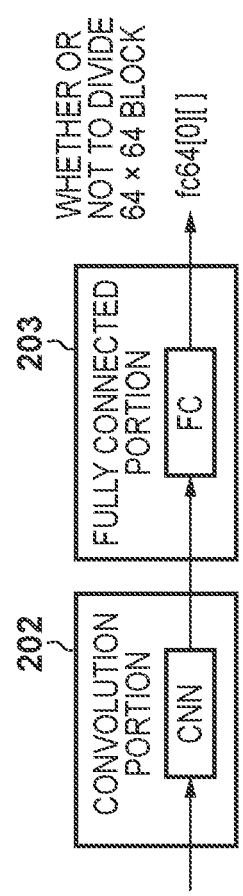
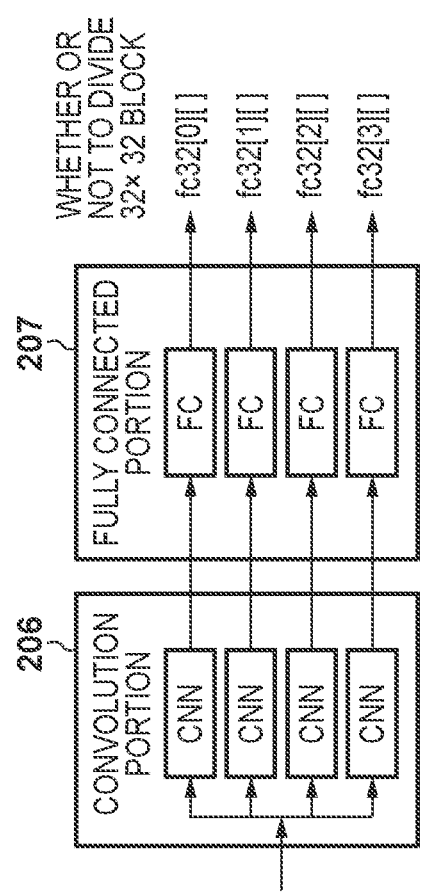
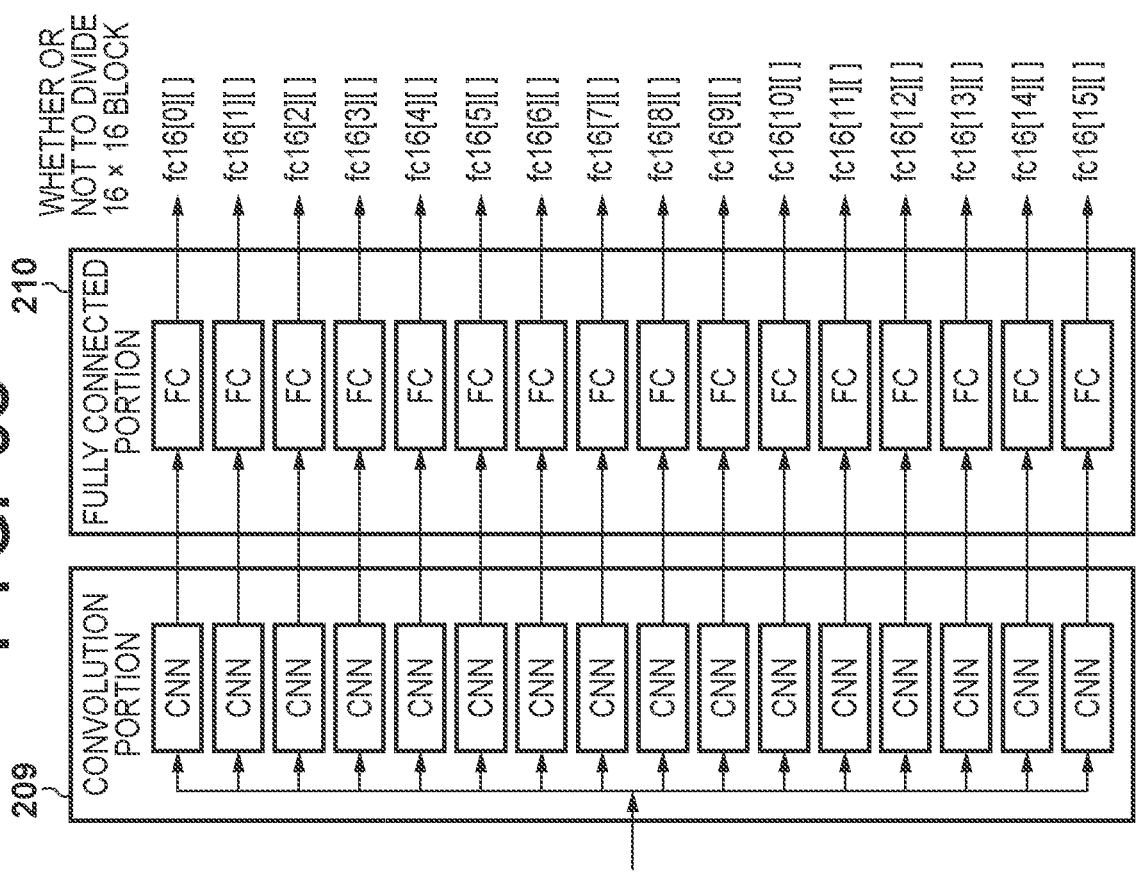

FIG. 11

| BEFORE INCONSISTENCY CORRECTION | | | INCONSISTENCY STATE | AFTER INCONSISTENCY CORRECTION | | |
|---|---|---|---|---|---|---|
| 64×64 | 32×32 | 16×16 | | 64×64 | 32×32 | 16×16 |
| DIVIDE | DIVIDE | DIVIDE | CONSISTENCY | — | — | — |
| | | NO DIVIDE | CONSISTENCY | — | — | — |
| | NO DIVIDE | DIVIDE | INCONSISTENCY | DIVIDE | DIVIDE | DIVIDE |
| | | NO DIVIDE | CONSISTENCY | — | — | — |
| NO DIVIDE | DIVIDE | DIVIDE | INCONSISTENCY | DIVIDE | DIVIDE | DIVIDE |
| | | NO DIVIDE | INCONSISTENCY | DIVIDE | DIVIDE | NO DIVIDE |
| | NO DIVIDE | DIVIDE | INCONSISTENCY | DIVIDE | DIVIDE | DIVIDE |
| | | NO DIVIDE | CONSISTENCY | — | — | — |

— : NO INCONSISTENCY CORRECTION

DIVISION PATTERN DETERMINING APPARATUS AND LEARNING APPARATUS AND METHOD FOR CONTROLLING SAME AND NON-TRANSITORY COMPUTER-READABLE STORAGE MEDIUM

BACKGROUND OF THE INVENTION

Field of the Invention

The present invention relates to a division pattern determining apparatus and a learning apparatus and a method for controlling same and a non-transitory computer-readable storage medium.

Description of the Related Art

The use of video data through video distribution service and the like has become huge in scale in recent years. Also, to meet the demands placed on recording and transmitting high resolution and high frame rate video, data compression encoding technology has become indispensable.

For example, H.265/HEVC (High Efficiency Video Coding, hereinafter referred to as HEVC) has been a video encoding standard since 2013. In comparison to H.264/AVC (Advanced Video Coding, hereinafter referred to as AVC), the standard of the previous generation, HEVC has double the compression performance at the same level of image quality. However, the amount of calculations for HEVC is enormous compared to the amount of calculations for AVC.

In HEVC, an image to be encoded is divided into CTUs (coding tree units), which are blocks 64×64 pixels in size. Then, the image encoding apparatus executes encoding processing on each CTU. Also, in HEVC, the CTUs are recursively divided into coding units (CUs), which are units for encoding. This results in the CUs having sizes of 64×64 pixels, 32×32 pixels, 16×16 pixels, and 8×8 pixels. Encoding efficiency can be improved by executing size adjustment in which the complicated regions of the image are set with small CUs and the uncomplicated regions of the image are set with large CUs.

Note that in HEVC, CUs are further divided into prediction units (PUs), which are units for prediction, and transform units (TUs), which are units for transforming. Size adjustment can also be executed on PUs and TUs to improve encoding efficiency.

However, for example, in the HEVC Test Model (HM) developed by the Joint Collaborative Team on Video Coding (JCT-VC), using rate-distortion optimization, all CU sizes and prediction modes are searched to calculate the CU size and prediction mode with the lowest cost. Also, in cost calculation, encoding must actually be executed. This makes the amount of calculations to select the appropriate CU size enormous.

Deep learning technology using a neural network has application in a wide variety of technical fields and is said to have surpassed human recognition capability particularly in image recognition and classification. Typically, in classification, high resolution or large objects yield good performance, and low resolution or small objects yield poor performance. By using such deep learning technology, the problem of CU size can be reframed as a classification problem of whether to divide or not. Thus, to determine the CU size, classification based on supervised learning using a neural network can be used.

By preparing a large number of learning sets in which an input image is used as a CTU and a CU division pattern obtained by a software model that performs a full search such as an HM is used as training data, it is possible to learn a division pattern for a CTU and infer a division pattern of an unknown CTU. Compared to a full search method, this method can reduce the complexity in determining division patterns.

However, if you include all of the division patterns of the CUs, the number of output patterns comes to an enormous amount of over 80000. This makes increasing classification accuracy difficult, requiring the neural network to be very deep.

In Japanese Patent Laid-Open No. 2018-182531, technology is described in which, on the basis of a division probability learnt in advance, an input CTU is classified into two for whether or not to divide the 64×64 pixels, which is the CTU size, for whether or not to divide the four 32×32 pixels included in the CTU, and for whether or not to divide the 16 16×16 pixels included in the CTU. In other words, the division pattern is determined by a total of 21 classification results. According to this Patent Document, 80000 or greater classifications are not necessary, and the amount of calculations can be reduced.

However, with the technology of this Patent Document, there is no difference between the amount of calculations for determining a division pattern of a large size and for determining a division pattern a division pattern of a small size. Thus, considering that typically classification accuracy is lower when using smaller images, the accuracy of the division necessity/nonnecessity determination for smaller sizes is lower with respect to the accuracy of the division necessity/nonnecessity determination for larger sizes. Also, increasing the accuracy of the division necessity/nonnecessity determination for smaller sizes results in the processing for determining the division necessity/nonnecessity of larger sizes redundant and the amount of calculations increases.

SUMMARY OF THE INVENTION

In light of the problems described above, the present invention is directed at providing technology that can reduce the amount of calculations in processing for determining a division pattern formed by a hierarchical structure for a target image and increasing division accuracy of small block size.

According to an aspect of the invention, there is provided a division pattern determining apparatus for determining a division pattern for dividing a region to be encoded in image data using a neural network, comprising: a determining portion configured to execute on the image data of the region to be encoded a determination for a plurality of blocks of different sizes whether or not to divide each block using a neural network and determine a division pattern of one or more blocks included in the region to be encoded on the basis of the determination, wherein the neural network of the determining portion is constituted by a plurality of layers; and wherein when a size of a block for which whether or not to divide is to be determined is large, information from an intermediate layer positioned in an upper position is used.

According to the present invention the amount of calculations in processing for determining a division pattern formed by a hierarchical structure for a target image can be reduced and division accuracy of small block size can be increased.

Further features of the present invention will become apparent from the following description of exemplary embodiments (with reference to the attached drawings).

BRIEF DESCRIPTION OF THE DRAWINGS

FIGS. 5A to 5C illustrate an example configuration of fully connected portions and the preceding convolution portions according to the first embodiment.

FIG. 11 is a diagram illustrating an example of inconsistency correction results according to a fourth embodiment.

DESCRIPTION OF THE EMBODIMENTS

Figure 1:
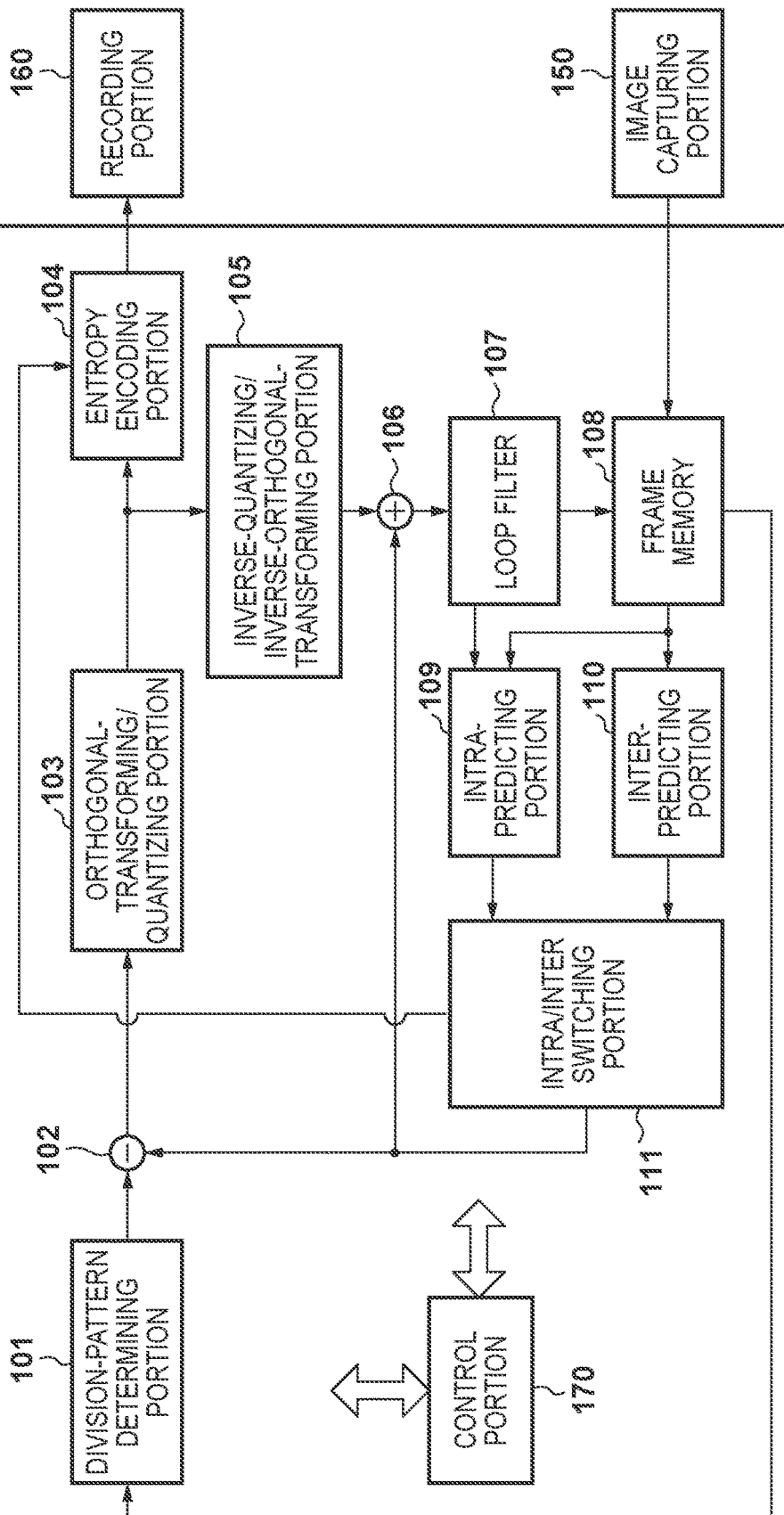
FIG. 1 illustrates a configuration of an image encoding apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Configuration

Figure 2:
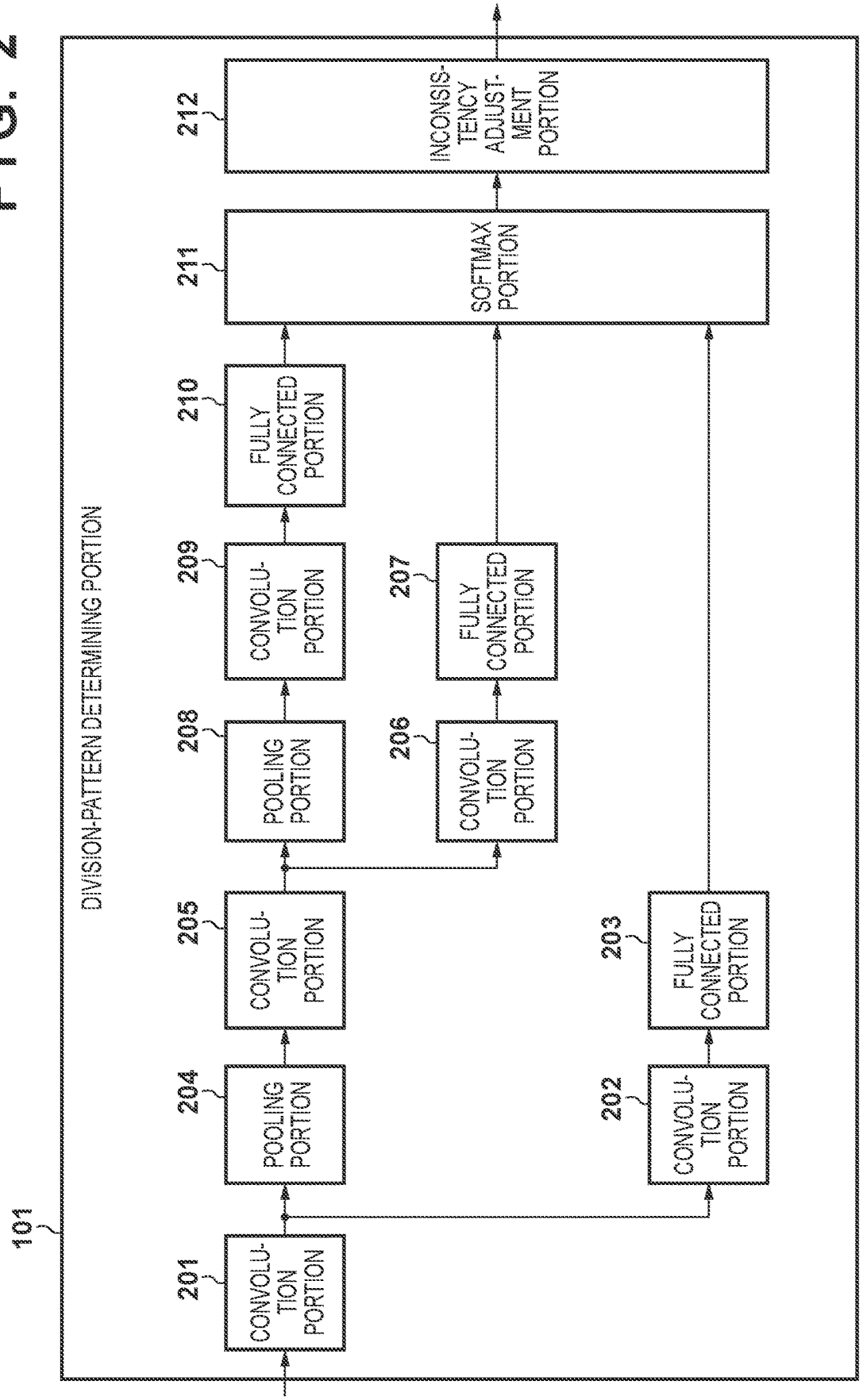
FIG. 2 is a diagram illustrating a configuration of a division-pattern determining portion according to the first embodiment.

FIG. 1 illustrates an example configuration of an image encoding apparatus according to the first embodiment. Also, FIG. 2 illustrates an example configuration of a division-pattern determining portion in FIG. 1.

Firstly, the configuration and operation of an image encoding apparatus 100 according to the present embodiment will be described with reference to FIG. 1. The image encoding apparatus 100 is integrated into an image capture apparatus such as a camera. The image encoding apparatus 100 includes a control portion (a portion constituted by a CPU and memory storing a program executed by the CPU) 170 that controls the entire apparatus. Also, the image encoding apparatus 100 receives image data obtained by an image capturing portion 150 and encodes the image data switching between intra-encoding and inter-encoding as appropriate to generate encoded data. Then, the image encoding apparatus 100 outputs the generated encoded data to a recording portion 160. The recording portion 160 records the received encoded data as an image file on a recording medium represented by an SD card. The image encoding apparatus 100 executes encoding using coding tree units (CTUs) 64×64 pixels in size in the frame to be encoded as the block unit.

A division-pattern determining portion 101 determines a division pattern for a held-in-advance CTU in the image data of the target frame stored in frame memory 108 described below and generates coding units (CU) in an inclusion relationship with the CTU by recursively dividing the CTU into a hierarchical structure. The division-pattern determining portion 101 uses a pre-trained learning coefficient to determine the division pattern. The detailed configuration and learning method of the division-pattern determining portion 101 will be described below.

With HEVC, a CU is further divided into prediction units (PUs) and transform units (TUs). However, in the present embodiment, for the sake of simplification, the PU size and TU size are sizes uniquely determined depending on the CU size.

Note that size determination based on cost calculation taking into account all combinations with PU and TU may be performed. Also, the division-pattern determining portion 101 determines the CU division pattern. However, the division-pattern determining portion 101 can also determine the division pattern for the PUs and the TUs using the method of the present embodiment in a similar manner for the CUs.

A subtractor 102 calculates the difference between the image block output from the division-pattern determining portion 101 and a prediction image output from an intra/inter switching portion 1/1 and generates difference image data.

An orthogonal-transforming/quantizing portion 103 executes orthogonal-transforming on the difference image data, executes quantization processing on the conversion factor, i.e., the post-orthogonal-transforming data, and generates a quantized conversion factor.

An entropy encoding portion 104 executes entropy encoding, such as context-based adaptive variable-length coding (CAVLC) and context-based adaptive binary arithmetic coding (CABAC), on the quantized conversion factor and outputs encoded data to the recording portion 160. The entropy encoding portion 104 also outputs motion vectors and the intra-prediction mode reported from the intra/inter switching portion 111 as encoded data.

An inverse-quantizing/inverse-orthogonal-transforming portion 105 executes inverse-quantizing and inverse-orthogonal-transforming of the quantized conversion factor reported from the orthogonal-transforming/quantizing portion 103 and generates post-inverse-transforming data.

An adder 106 adds together the post-inverse-transforming data and the prediction image data reported from the intra/inter switching portion 111 to generate reconstructed image data.

A loop filter 107 executes filter processing on the reconstructed image data to reduce encoding distortion and generate post-filter-processing reconstructed image data.

The frame memory 108 stores the post-filter-processing reconstructed image data and the image data, which is the frame to be encoded, from the image capturing portion 150. Also, the frame memory 108 reports the post-filter-processing reconstructed image data to an intra-predicting portion 109 to be used in intra-prediction.

The intra-predicting portion 109 selects an intra-prediction system on the basis of the correlation between the block of the frame to be encoded and candidates from the intra-prediction image data generated from pixel data from around the block to be encoded already encoded stored in the frame memory 108 and reports the selected intra-prediction image data and the associated vector to the intra/inter switching portion 111.

An inter-predicting portion 110 searches for a motion vector that produces the lowest difference between the original image of the image to be encoded stored in the frame memory 108 and the reference image and reports the inter-prediction image and the associated motion vector to the intra/inter switching portion 111.

The intra/inter switching portion 111 selects a prediction system that produces the smallest difference image data on the basis of the prediction results of the inter-predicting portion 110 and the intra-predicting portion 109 and outputs the selected prediction image to subtractor 102. Also, to identify the prediction image, the intra/inter switching portion 111 reports the intra/inter type and the vector to the entropy encoding portion 104.

The configuration and operation of the image encoding apparatus 100 according to the present embodiment has been described above.

Next, the configuration and operation of the division-pattern determining portion 101 will be described using FIG. 2.

The division-pattern determining portion 101 includes convolution portions 201, 202, 205, 206, 209, pooling portions 204, 208, fully connected portions 203, 207, 210, a softmax portion 211, and an inconsistency adjustment portion 212.

The convolution portions 201, 202, 205, 206, 209 execute a convolution operation using a pre-training-selected learning coefficient on the input image or post-convolution-processing image feature data and generates image feature data. The convolution portions 201, 202, 205, 206, 209 may include a plurality of filters or there may be a plurality of convolutional layers (convolutional neural network layer or CNN) in the convolution portion. Also, the convolution portions 201, 202, 205, 206, 209 may have a different number of filters, number of layers, and the like in the convolution configuration.

The pooling portion 204 executes pooling processing on the image feature data from the convolution portion 201. The pooling portion 208 executes pooling processing on the image feature data from the convolution portion 205. In the present embodiment, the pooling portions 204, 208 each employ max pooling that obtains the maximum value of a 2×2 pixel unit, but no such limitation is intended. Also, the division-pattern determining portion 101 may have a configuration not including a pooling portion.

The fully connected portions 203, 207, 210 execute fully connected processing on the image feature data from the preceding convolution portion and outputs two values corresponding to "divide" and "no divide" (details described below).

The softmax portion 211 is input with the values from the fully connected portions 203, 207, 210, converts the input values into normalized probability values between 0 and 1, then outputs these values to the inconsistency adjustment portion 212. Though details are described below, in one example, the fully connected portion 210 outputs two values, a "divide value" and a "no divide value" for dividing the target block of 64×64 pixels into four blocks of 32×32 pixels. To make the two values from the fully connected portion 210 probability values, the softmax portion 211 normalizes the values to be between 0 and 1. Also, the softmax portion 211 outputs a "divide probability value" and a "no divide probability value" for the target block of 64×64 pixels to the inconsistency adjustment portion 212. The softmax portion 211 executes similar processing on the values from the fully connected portions 207, 210.

The inconsistency adjustment portion 212 determines the final block size of the target CTU on the basis of all of the probability values output from the softmax portion 211 (details described below).

Figure 3:
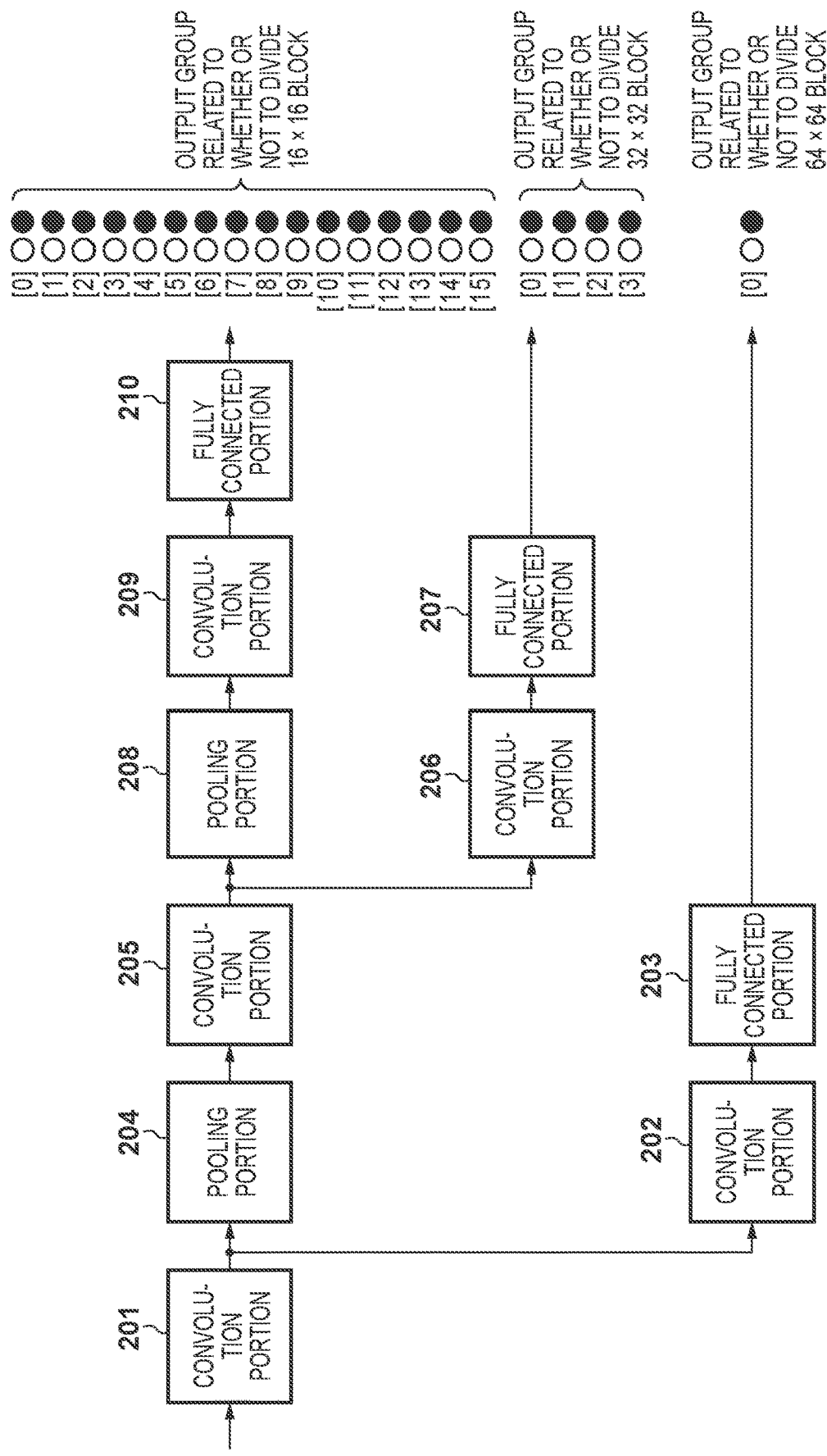
FIG. 3 is a diagram illustrating the relationship between the output values of fully connected portions and block size according to the first embodiment.

FIG. 3 is a diagram illustrating the relationship between the output values from the fully connected portions 203, 207, 210 and the block size.

As illustrated in FIG. 3, the values output by the fully connected portion 203 branched off from the convolution portion 201 near the input layer are two values, a "divide value" and a "no divide value" for dividing the block of 64×64 pixels.

The values output by the fully connected portion 207 branched off from the convolution portion 205 next nearest to the input layer are values corresponding to a "divide value" and a "no divide value" for each of the four 32×32 pixel block position included in the CTU. Because there are four blocks of 32×32 pixels and two values, a "divide value" and a "no divide value", for each of the blocks, eight values are output by the fully connected portion 207.

Also, the values output by the fully connected portion 210 connected to the convolution portion 209 farthest from the input layer are values corresponding to divide and no divide for each of the 16 16×16 pixel block positions included in the CTU. Because there are 16 blocks of 16×16 pixels included in the CTU and two values, a "divide value" and a "no divide value", for each of the blocks, 32 values are output by the fully connected portion 210.

Figure 4:
FIG. 4 is a diagram illustrating the relationship between the output values of a softmax portion and block position according to the first embodiment.

FIG. 4 is a diagram illustrating the relationship between the output values illustrated in FIG. 3 and the block positions of the CTU. The three arrays in FIG. 4 are indexes with pixel positions in the CTU for determining whether division of 64×64 pixels is necessary or not, whether division of 32×32 pixels is necessary or not, and whether division of 16×16 pixels is necessary or not. Also, in the diagram, the X in [X] represents the index number.

The CTU has a size of 64×64 pixels. Thus, the CTU can only include one block of 64×64 pixels. However, for the sake of convenience, the index of this block is represented by fc64[0]. The "divide value" of block fc64[0] output by the fully connected portion 203 is represented by fc64[0][0], and the "no divide value" is represented by fc64[0][1].

Four blocks of 32×32 pixels are included in the CTU. The blocks are represented by fc32101 to fc32[3]. Also, the "divide value" of the i-th block fc32[i] (i=0, 1, 2, or 3) output by the fully connected portion 207 is represented by fc32[i][0], and the "no divide value" is represented by fc32[i][1].

Note that hereinafter, fc32[i] is referred to as the i-th 32×32 pixel block. This is the same for the 16×16 pixel block.

16 blocks of 16×16 pixels are included in the CTU. The blocks are represented by fc16[0] to fc16[15]. Also, the "divide value" of the i-th block fc16[i] (i=0, 1, 2, . . . , or 15) output by the fully connected portion 210 is represented by fc16[i][0], and the "no divide value" is represented by fc6[i][1].

Also, in a case where no distinction is drawn between the "divide value" and the "no divide value" of a block fcX[i] (X=64, 32, or 16, i is a value within a range dependent on X), fcX[i][ ] is used.

FIG. 5A illustrates the configuration of the fully connected portion 203 and the preceding convolution portion 202 of the present embodiment. FIG. 5B illustrates the configuration of the fully connected portion 207 and the preceding convolution portion 206. FIG. 5C illustrates the configuration of the fully, connected portion 210 and the preceding convolution portion 209.

The fully connected portions 207, 210 output division necessity/nonnecessity of a plurality of blocks with different pixel positions of the same CTU. In the present embodiment, as illustrated in FIGS. 5A to 5C, from the convolution portion preceding the fully connected portion, convolutional layers CNN corresponding to the number of outputs of the layers are independently structured in parallel, and the calculation results of the CNNs each independently undergo fully connected processing at the fully connected (FC) layer. Note that the number of CNN layers and FC layers is not required to be one each, and multiple layers may be used, or a configuration may be used in which the number of layers is different for each division necessity/nonnecessity determining element.

With such a configuration, the information of the entire surface of the CTU, i.e., the input image, is put through convolution operations and is aggregated, and the division necessity/nonnecessity corresponding to a specific pixel position of the CTU can be calculated via a calculation depending on the pixel position.

Note that the division-pattern determining portion 101 is only required to have a configuration that outputs two values representing divide and no divide, and this does not need to be by fully connected processing. For example, regarding the post-CNN-processing filter coefficient, global average pooling or other such methods maybe used to obtain one coefficient by taking the average of each channel. Also, the convolutional layers of the fully connected portion may not be structured in parallel as in the present embodiment, and the output of a CNN formed from one or more filters may be used as common input data at the fully connected portions.

Next, the probability, converted into a probability by normalization, at the output interface of the softmax portion 211 and determining conditions for division necessity/nonnecessity will be described. Note that the output value of the softmax portion 211 is represented by softX[i][ ]. Herein, X, i have the same meaning as X, i as described above in reference to the output value fcX[i][ ] of the fully connected portions 203, 207, 210.

For example, regarding a block of 64×64 pixels, at the output interface of the softmax portion 211, when the divide probability is 70%, soft64[0][0] equals 0.7. Also, when the no divide probability is 30%, soft64[0][1] equals 0.3. In other words, soft64[0][0]>soft64[0][1] holds true, and accordingly, the softmax portion 211 outputs a determination result of "divide" regarding the block of 64×64 pixels. In this manner, the division necessity/nonnecessity of the target block can be determined according to the greater probability value.

The softmax portion 211 outputs a division necessity/nonnecessity determination regarding the blocks of 32×32 pixels and the blocks of 16×16 pixels. These outputs corresponds to soft32[0][ ] to soft32[3][ ] and soft16[0][ ] to soft16[15][ ]. For example, in a case where soft32[0][0] ≤soft32[0][1] holds true (the divide probability value is equal to or less than the no divide probability value), the 0th block of 32×32 pixels is determined to be not divided. Also, in a case where soft32111[0]>soft32[1][1] holds true (the divide probability value is greater than the no divide probability value), the 1st block of 32×32 pixels is determined to be divided into four blocks of 16-16 pixels.

Hereinafter, for the sake of simplification, softX[n][0]>softX[n][1] holding true is referred to as "probability value of dividing n-th block of X×X pixels is greater than probability value of not dividing" or "Yes to dividing n-th block of X×X pixels". Also, softX[n][0]≤softX[n][1] holding true is referred to as "probability value of dividing n-th block of X×X pixels is equal to or less than probability value of not dividing" or "No to dividing n-th block of X×X pixels".

Next, the processing of the inconsistency adjustment portion 212 in the present embodiment will be described.

As described above, a pair of probability values, a divide probability value and a no divide probability value, for a single block is obtained. In the present embodiment, the number of blocks in 1 CTU is 21 (1+4+16). Thus, the inconsistency adjustment portion 212 is input with pairs of probability values for these 21 blocks. Important to note is that, the fully connected portions 203, 207, 210 independently obtain a divide value and a no divide value for each block, and the softmax portion 211 also executes normalization processing into probability values for each block.

Thus, depending on the outputs from the softmax portion 211, even in a case where the probability value to divide the (0th) block of 64×64 pixels is equal to or less than the no divide probability value, the n-th block of 32×32 pixels of the lower layer may have a probability value to divide that is greater than the no divide probability value.

In such cases, the inconsistency adjustment portion 212 of the present embodiment, whether or not to divide the block is determine according to a rule that "priority to divide or not is given to the block with a larger size over the block with a smaller size included in the larger block".

Also, in a case where the determination of whether or not to divide the block with a larger size is "no", the inconsistency adjustment portion 212 adjusts the determination of whether or not divide of all of the blocks of a smaller size included in the larger block to "no". Furthermore, in a case where the determination of whether or not to divide the block with a larger size is "yes", the inconsistency adjustment portion 212 allows the determination of whether or not divide of all of the blocks of a smaller size included in the larger block to be executed.

A detailed example of the processing of the inconsistency adjustment portion 212 will now be described with reference to FIGS. 6A and 6B.

Figure 6A:
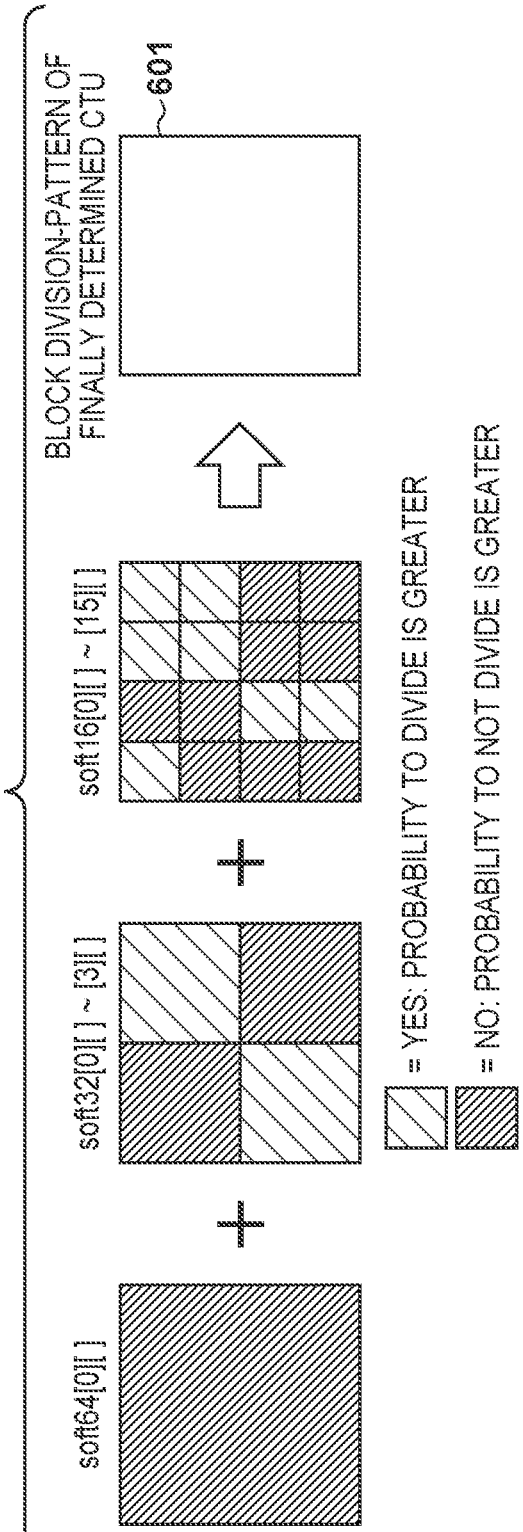
FIGS. 6A and 6B are diagrams illustrating an example of the processing of an inconsistency adjustment portion according to the first embodiment.
Figure 6B:
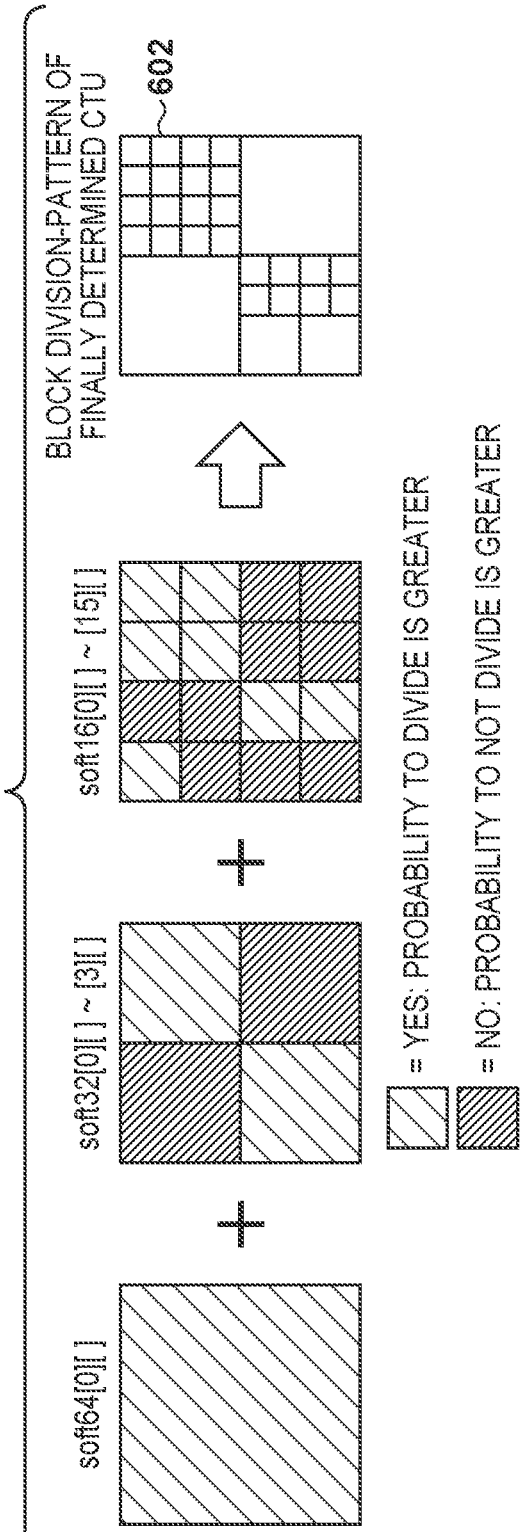

The "yes" on blocks in FIGS. 6A and 6B indicates that the divide probability value of the block is greater than the no divide probability value. Also, the "no" indicates that the divide probability value of the block is equal to or less than the no divide probability value.

FIG. 6A illustrates a case where the output of the softmax portion 211 is "no", indicating no divide, for the block of 64×64 pixels. Thus, the inconsistency adjustment portion 212 determines the final division pattern for the CTU with a size of 64-64 pixels to be an undivided block division pattern 601, regardless of the determination of whether or not it is necessary to divide the blocks of 32×32 pixels and the blocks of 16×16 pixels.

FIG. 6B illustrates a case where the block of 64×64 pixels is "yes" and two of the four blocks of 32×32 pixels are "yes" and the remaining two are "no". In this case, as per the condition described above, a determination of "yes" or "no" for dividing the blocks of 16×16 pixels is allowed because the blocks of 32×32 pixels of an upper layer including these blocks are determined as "yes".

The processing by the inconsistency adjustment portion 212 of the present embodiment to implement that described above will be described following the flowchart of FIG. 7. Note that in this embodiment, the inconsistency adjustment portion 212 includes a memory that stores a counter variable i and the like described below.

Note that as described above, softX[n][0]>softX[n][1] holding true is referred to as "No to dividing block n of X×X pixels".

In step S701, the inconsistency adjustment portion 212 determines whether or not division of the target block of 64×64 pixels is "yes". In other words, the inconsistency adjustment portion 212 determines whether or not soft64[0][0]>soft64[0][1] holds true. In a case where the inconsistency adjustment portion 212 determines that division of the target block is "yes", the processing branches to step S703, and in a case where the inconsistency adjustment portion 212 determines that division is "no", the processing branches to step S702.

In step S702, the inconsistency adjustment portion 212 overwrites the values for whether or not to divide to "no" for all of the blocks in the lower layer included in the target block of 64×64 pixels. In other words, the inconsistency adjustment portion 212 overwrites soft32[0][ ] to soft32[3][ ] and soft16[0][ ] to soft16[15][ ] to a value indicating "no" for division. To put it simply, the inconsistency adjustment portion 212 makes softX[i][0]=0.0 (=0%) and softX[i][1]=1.0 (=100%). Here, X is 16 and 32. Then, the inconsistency adjustment portion 212 ends processing.

In step S703, the inconsistency adjustment portion 212 initializes the counter variable i to "0". Then, in step S704, the inconsistency adjustment portion 212 determines whether or not division of the i-th target block of 32×32 pixels is "yes". In other words, the inconsistency adjustment portion 212 determines whether or not soft32[i][0]>soft32[i][1] holds true. In a case where the inconsistency adjustment portion 212 determines that division of the target block is "yes", the processing proceeds to step S706. In this case, the values to divide or not of the four 16×16 pixels included in the target block are carried over.

However, in step S704, in a case where the inconsistency adjustment portion 212 determines "no" for division of the i-th target block of 32×32 pixels, the processing proceeds to step S705.

In step S705, the inconsistency adjustment portion 212 overwrites the values for whether or not to divide to "no" for the four blocks of 16×16 pixels included in the i-th target block of 32×32 pixels. The four blocks of 16×16 pixels included in the target block of 32×32 pixels are, from FIG. 4, the [4×i]-th, the [4×i+1]-th, the [4×i+2]-th, and the [4×i+3]-th block. Thus, the inconsistency adjustment portion 212 overwrites soft16[4×i][0], soft16[4×i+1][0], soft16[4×i+2][0], and soft16[4×i+3][0] to "0.0". Also, the inconsistency adjustment portion 212 overwrites soft16[4×i][1], soft16[4×i+1][1], soft16[4×i+2][1], and soft16[4×i+3][1] to "1.0".

In step S706, the inconsistency adjustment portion 212 determines whether or not the value of the counter variable i is "3". In a case where the inconsistency adjustment portion 212 determines that the value of the counter variable i is "3", the processing to determine whether or not to divide on the four blocks of 32×32 pixels ends, and the present processing ends. However, in a case where the inconsistency adjustment portion 212 determines that the value of the counter variable i is not "3", the processing proceeds to step S707.

In step S707, the inconsistency adjustment portion 212 increments i by "1", the processing returns to step S704, and the processing from step S704 onward is repeated.

This results in the processing to determine whether or not to divide being executed on the four 32×32 pixel positions included in the CTU.

By executing the processing described above, the division-pattern determining portion 101 including the inconsistency adjustment portion 212 can eliminate inconsistency in the division probability between different layers of different sizes and determine the final CTU division pattern.

Note that, via executing a program, the control portion 170 may function as the processing portions of the image encoding apparatus 100 illustrated in FIG. 1. In other words, processing equivalent to the embodiment described above may be implemented by a CPU and (memory storing) a computer program executed by the CPU. The same applies to the other embodiments described below.

Second Embodiment

Figure 7:
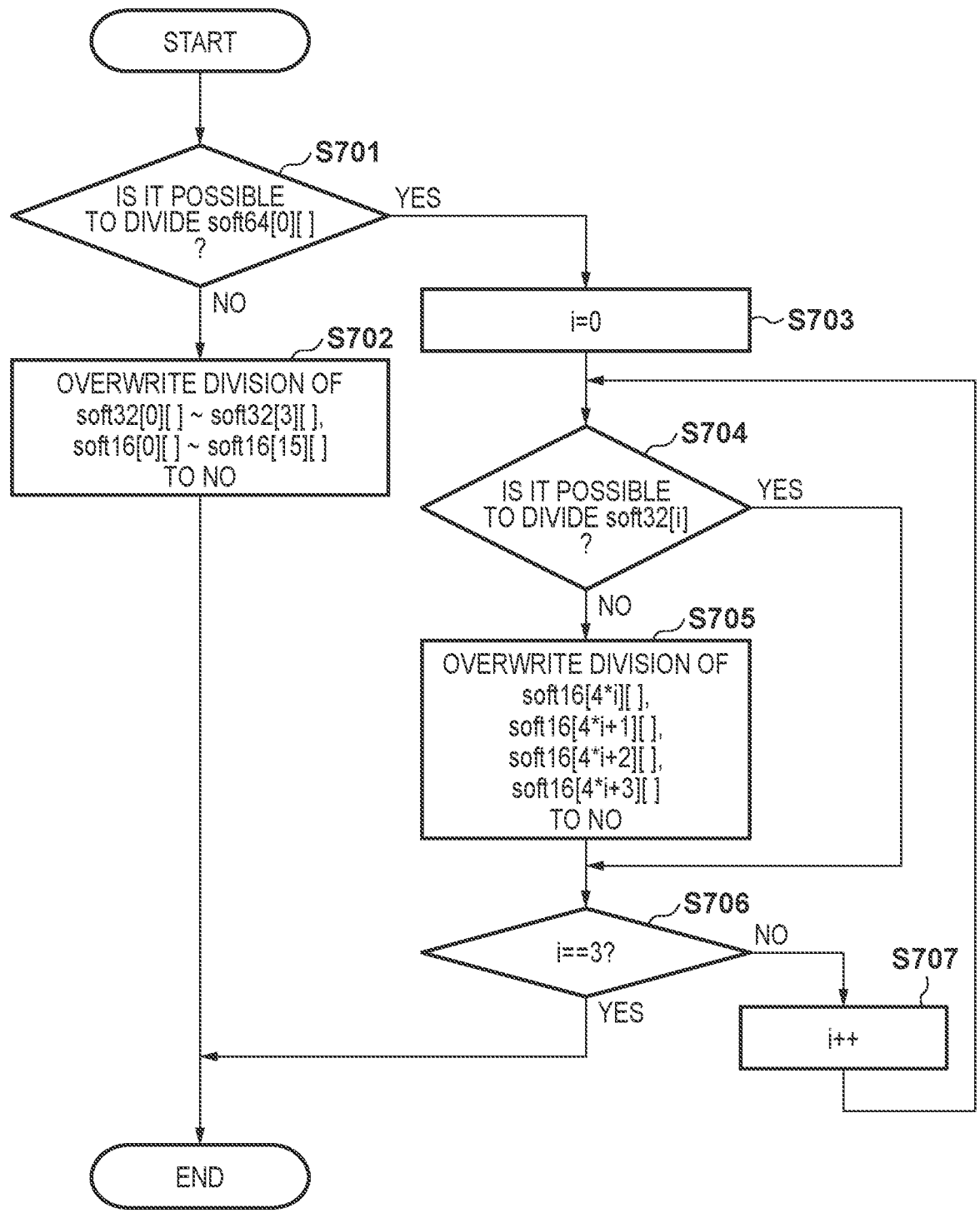
FIG. 7 is a diagram illustrating the processing of the inconsistency adjustment portion according to the first embodiment.

As described above, in the first embodiment, (the inconsistency adjustment portion 212 of) the division-pattern determining portion 101 executes processing following the flowchart of FIG. 7. However, as described below, an equivalent processing is executed in the second embodiment.

As can be understood from the flowchart of FIG. 7, in a case where to divide a block of larger size is "no", there is no need to calculate whether or not to divide the smaller blocks including in the larger block.

Figure 8:
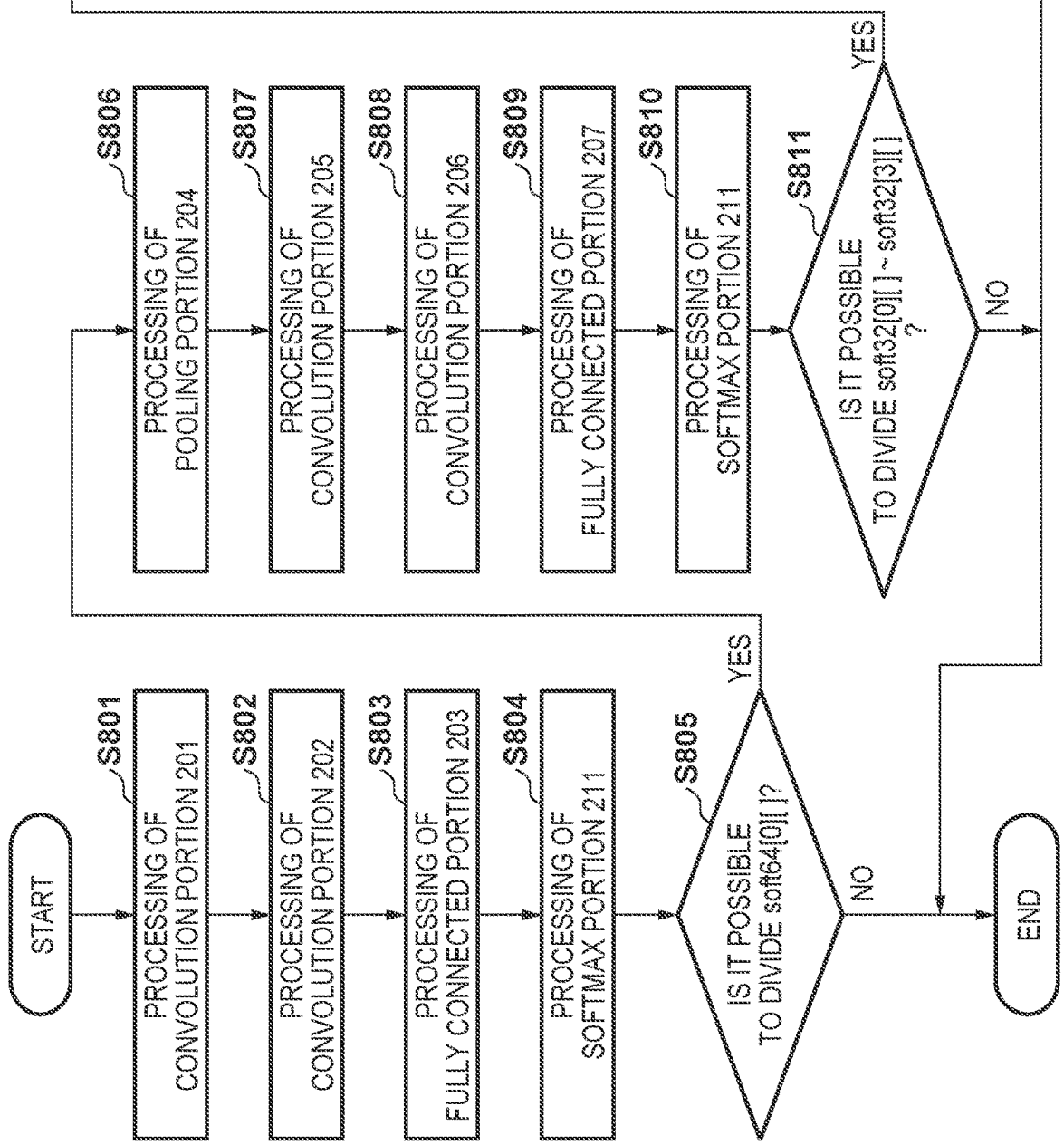
FIG. 8 is a diagram illustrating the processing of a division-pattern determining portion according to the first embodiment.

The processing of the division-pattern determining portion 101 according to the second embodiment described below follows the flowchart of FIG. 8. The processing of the division-pattern determining portion 101 of the second embodiment is suitable in a case where the processing is implemented by software, as will be made apparent from the description below.

In step S801, the division-pattern determining portion 101 executes the processing of the convolution portion 201. Then, in step S802, the division-pattern determining portion 101 executes the processing of the convolution portion 202. In step S803, the division-pattern determining portion 101 executes the processing of the fully connected portion 203.

Then, in step S804, the division-pattern determining portion 101 executes the processing of the softmax portion 211. At this point, as only an output relating to whether or not to divide block fc64[0] has been obtained, the softmax portion 211 converts only soft64[0][ ] to a probability value.

In step S805, the division-pattern determining portion 101 determines whether or not to divide the blocks of 64×64 pixels on the basis of the value of soft64[0][ ] obtained by the softmax portion 211. In a case where division is determined as "no" (N in Step S805), the present processing ends, and in a case where the division is determined as "yes" (Y in step S805), the processing branches to step S806.

In step S806, the division-pattern determining portion 101 executes the processing of the pooling portion 204. In step S807, the division-pattern determining portion 101 executes the processing of the convolution portion 205. In step S808, the division-pattern determining portion 101 executes the processing of the convolution portion 206. In step S809, the division-pattern determining portion 101 executes the processing of the fully connected portion 207.

Then, in step S810, the division-pattern determining portion 101 executes the processing of the softmax portion 211. At this point, as outputs relating to whether or not to divide fc16[0] to fc16[15] have not been obtained, the softmax portion 211 converts them to the probability values of soft32[0][ ] to soft32[3][ ].

In step S811, the division-pattern determining portion 101 determines whether or not to divide the four blocks of 32×32 pixels on the basis of the values of soft32[0][ ] to soft32[3][ ] obtained by the softmax portion 211. In a case where the division-pattern determining portion 101 determines the division of all four blocks to be "no" (N in Step S811), the present processing ends. However, in a case where the division-pattern determining portion 101 determines the division of even one of blocks of 32×32 pixels to be "yes" (Y in Step S811), the processing branches to step S812.

Note that it should be understood that there is meaning in that in a case where the determination of Step S811 is Y, the number of blocks of 32×32 pixels with a division determination of "yes" is from 1 to 4. Hereinafter, blocks of 32×32 pixels with a division determination of "yes" are represented by soft32[n]. Here, it should be clear that n is an integer ranging from 0 to 3.

In step S812, the division-pattern determining portion 101 executes the processing of the pooling portion 208. In step S813, the division-pattern determining portion 101 executes the processing of the convolution portion 209 of an image position of a block soft32[n] with a division determination of "yes". In step S814, the division-pattern determining portion 101 executes the processing of the fully connected portion 210 relating to the image position with a division determination of "yes" at soft32[n] with a divide determination of "yes".

In step S815, the division-pattern determining portion 101 executes the processing of the softmax portion 211 relating to the image position of the block soft32[n] with a division determination of "yes". In other words, the softmax portion 211 only executes calculations on soft16[n][ ] included in the image position of the block soft32[n] with a division determination of "yes".

As described above, the division-pattern determining portion 101 of the second embodiment can reduce the calculation load by cutting out unnecessary calculation processing. Thus, the present embodiment is particularly effective in cases implemented by software. Also, even in cases of implementation by hardware, lessening the calculations performed can be expected to result in a reduction in power consumption.

Note that the configuration of the present embodiment for reducing processing is not essential. For example, in the present embodiment, the processing of the pooling portion 204 is required to wait to determine whether or not to divide soft64[0][ ]. However, from the perspective of speeding up processing, executable processing may be speculatively proceeded with.

All processing included in the division-pattern determining portion 101 illustrated in FIG. 2 may be executed, or, for example, the pooling portion 204 and the convolution portion 205 may be speculatively executed and the processing may be stopped when the division of soft64[0] is determined to be "no".

In the present embodiment, the division-pattern determining portion 101 is constituted by a neural network. However, the division-pattern determining portion 101 may be constituted by a machine learning model other than a neural network.

With the configuration described above, the division necessity/nonnecessity of smaller blocks can be determined by diverting data of the CNN intermediate layer that calculates the division necessity/nonnecessity of the larger blocks and executing more calculations than the division necessity/nonnecessity of the larger blocks. In this manner, the amount of calculations can be reduced and the accuracy of the division necessity/nonnecessity determination of smaller blocks can be increased.

Third Embodiment

The learning of the division-pattern determining portion 101 according to the third embodiment will now be described.

As illustrated in FIG. 2, the division-pattern determining portion 101 includes a neural network, and the parameters, such as weight and bias, used in the filter operations of the neural network are generated by learning via multiple images (CTU).

In the third embodiment, the parameters updated by neural network learning are collectively referred to as "coefficient parameter".

Figure 9:
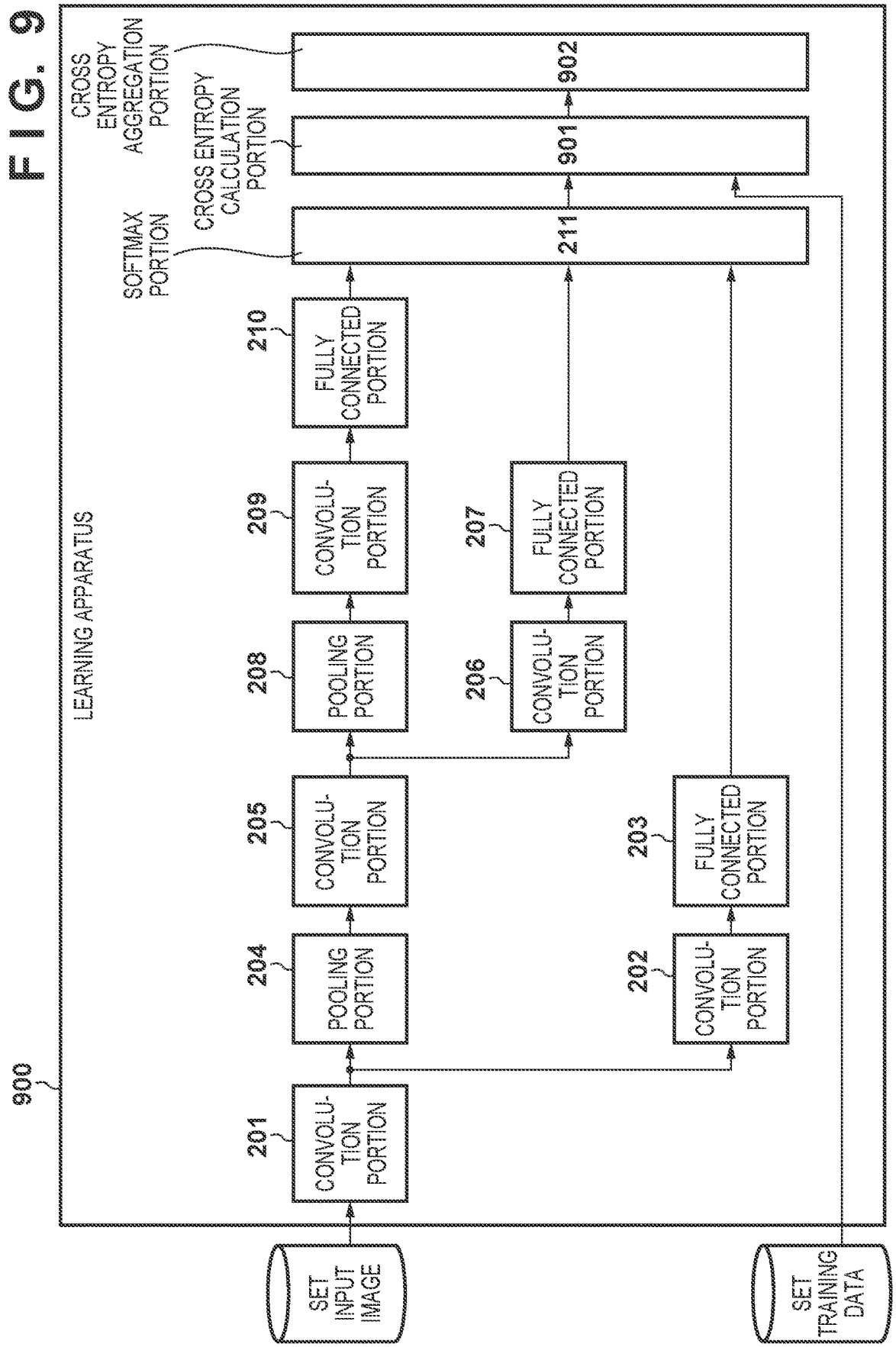
FIG. 9 is a diagram illustrating a configuration of a learning apparatus of a third embodiment.

FIG. 9 illustrates an example configuration of a learning apparatus 900 that determines the coefficient parameter of the division-pattern determining portion 101. Note that the configuration of the convolution portions, the pooling portions, the fully connected portions, and the like of the neural network is the same as the configuration included in FIG. 2. Also, instead of the inconsistency adjustment portion 212 of FIG. 2, a cross entropy calculation portion 901 and a cross entropy aggregation portion 902 are provided.

The configuration and operation of the learning apparatus 900 according to the third embodiment will be described below with reference to FIG. 9.

Firstly, a large difference between the division-pattern determining portion 101 and the learning apparatus 900 is that training data is input into the learning apparatus 900.

Training data forms a pair with input image data. In the present embodiment, the training data is calculated by software when HEVC Test Model (HM) created by Joint Collaborative Team on Video Coding (JCT-VC) is used, and is set as a CU division pattern actually used for encoding. Note that the training data may not be data calculated using HM (The configuration of the training data will be described in detail below).

The cross entropy calculation portion 901 executes a cross entropy calculation on each output value of the softmax portion 211 to obtain the loss when learning. The cross entropy aggregation portion 902 aggregates the cross entropy calculation results and calculates a loss_sum.

Note that in the present embodiment, cross entropy is used to calculate the loss when learning. However, a loss calculation method other than cross entropy, such as mean squared deviation. Also, in the present embodiment, the loss when learning is calculated for the data prior to inconsistency adjustment. However, the loss when learning may be calculated for data after inconsistency adjustment.

Figure 10:
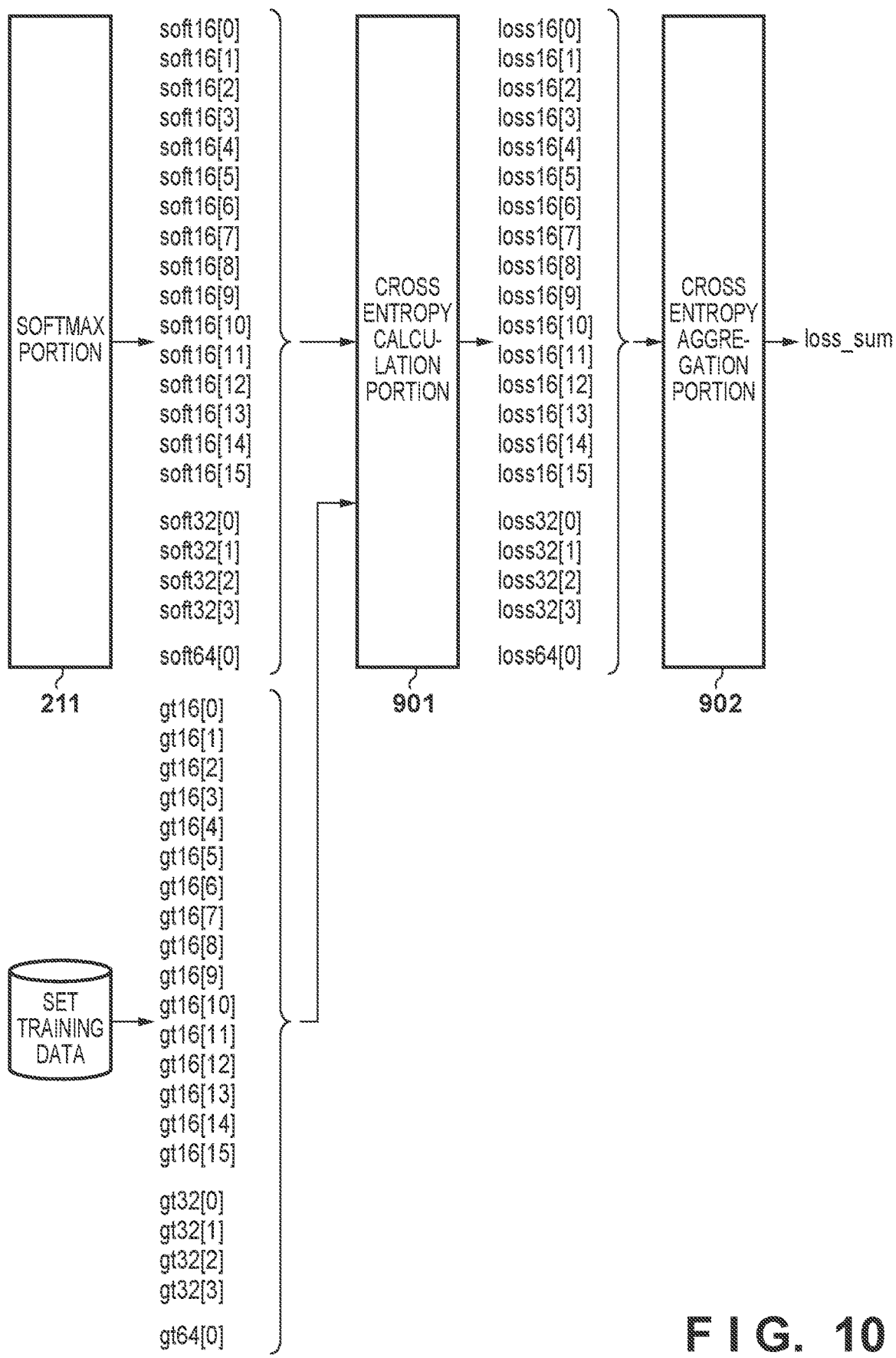
FIG. 10 is a diagram illustrating an image of input data of the learning apparatus of the third embodiment and data values before and after a cross entropy aggregation portion.

FIG. 10 is an image diagram of input data of the learning apparatus 900 and data values before and after the cross entropy aggregation portion.

As described above, the number of blocks included in one CTU is 21, and the softmax portion 211 outputs a maximum of 21 pairs of probability values for one CTU.

The training data contains the correct division necessity/nonnecessity (gt data) for the input image for each image (CTU) corresponding to each block position. This correct division necessity/nonnecessity is represented in FIG. 10 by gt64[0], gt32[0] to gt32[3], and gt16[0] to gt16[15].

Each gtX[n] data include a two-dimensional array, in a similar manner to the output of the softmax portion 211.

One-hot data is used, where in a case where correct means to divide, gtX[n][0]=1, gtX[n][1]=0, and in a case where correct means to not divide, gtX[n][0]=0, gtX[n][1]=1.

However, in a case where the division of the upper layer is "no", a correct division necessity/nonnecessity of the lower layer does not exist. Here, for the sake of convenience, elements for which a correct division necessity/nonnecessity does not exist are set as gtX[n][0]=−1, gtX[n][1]=−1. Note that the value itself has no meaning outside of representing that a correct division necessity/nonnecessity does not exist.

The cross entropy calculation portion 901 executes cross entropy calculations of the output data of the softmax portion 211 and the gt data for each element and calculates the cross entropy calculation result loss X[n] for each element. This lossX[n] is one-dimensional for all of the 21 elements. Cross entropy calculation result E is represented by:

$$E = -gtX[n] \log(\text{softX}[n]) - (1 - gtX[n]) \log(1 - \text{softX}[n]) \quad (1)$$

However, as described above, for the elements for which a correct division necessity/nonnecessity does not exist, cross entropy calculation is not executed by the cross entropy calculation portion 901.

For example, in a case where gt16[4][0]=gt16[4][1]=gt16[5][0]=gt16[5][1]=gt16[6][0]=gt16[6][1]=gt16[7][0]=gt16[7][1]=−1, cross entropy calculation of loss16[4], loss16[5], loss16[6], and loss16[7] is not executed.

The cross entropy aggregation portion 902 adds together the effective lossX[n] and divides the total by the effective number of elements to calculate a loss_sum.

In a case where the number of effective elements is different for each CTU excluding the elements for which a correct division necessity/nonnecessity does not exist, this calculate prevents a large variation in the values of loss_sum.

As described above, the learning apparatus 900 calculates the loss_sum and, in the present embodiment, uses the loss_sum to obtain a gradient representing the amount of change in the coefficient parameter via backpropagation and updates the coefficient parameter via stochastic gradient descent as a method of parameter optimization.

Note that the method for updating the coefficient parameter is one typical method used to train a neural network, and other methods, such as obtaining a gradient and parameter optimization may be used.

By repeating such training using many images, the neural network can perform coefficient parameter learning to get close to the correct division pattern and obtain the coefficient parameter of the division-pattern determining portion 101.

In the manner described above, by using the coefficient parameter obtained in advance via learning and diverting data of the CNN intermediate layer that calculates the division necessity/nonnecessity of the larger blocks, division necessity/nonnecessity of the lower layer is executed with more calculations than the division necessity/nonnecessity of the larger blocks. Thus, the amount of calculations can be reduced, and the division accuracy of smaller blocks can be increased.

Also, by omitting the processing of the lower layer, the processing amount can be further reduced.

Note that in the present embodiment, the block division pattern is determined using HEVC as an example. However, no such limitation is intended, and any encoding technology that encodes on the basis of the block division forming the hierarchical structure falls within the present embodiment for determining the block division pattern.

Fourth Embodiment

The fourth embodiment will be described below. The example configuration of the division-pattern determining portion 101 according to the fourth embodiment is the same as that illustrated in FIG. 2. The difference with the first embodiment is that an inconsistency adjustment portion 212 determines a final division pattern taking into account division necessity/nonnecessity information of the lower layer.

In the training of the neural network, as described in the first embodiment, training is performed to bring the correct division data and the output data as close together as possible, or, in other words, to increase the accuracy in terms of division necessity/nonnecessity.

However, to increase the actual encoding efficiency, a block division pattern with high image quality after encoding and decoding should be selected, and, though influenced by the image and bit rate, the division necessity/nonnecessity of smaller blocks most commonly greatly affect image quality.

Thus, in the fourth embodiment, the result of whether or not to divide smaller blocks is given priority and inconsistency is corrected. FIG. 11 illustrates the inconsistency correction result when the result of division necessity/nonnecessity of smaller blocks is given priority. In this manner, the division necessity/nonnecessity of larger blocks can be determined by the division necessity/nonnecessity of smaller blocks. In this case, the inconsistency correction portion 211 according to the fourth embodiment holds a lookup table LUT corresponding to the table in FIG. 11 and can execute inconsistency correction processing referencing this LUT Also, the present embodiment is not limited to giving priority to the division necessity/nonnecessity of smaller blocks, and the inconsistency correction method may be determined from the degree of image quality improvement when learning. For example, peak signal-to-noise ratio can be employed as an index of the degree of image quality improvement, and, after executing each kind of inconsistency correction, the image quality after decoding using HM or the like can be compare using PSNR to determine the inconsistency correction with the highest image quality. As the accuracy of division necessity/nonnecessity differs depending on the contents of the image group for which division necessity/nonnecessity is desired to be determined, determining the inconsistency correction method on the basis of learning is effective.

Also, a neural network may be used in the inconsistency correction portion 211. The inconsistency correction portion 211 may be input with a maximum of 21 pairs of probability values for whether or not to divide corresponding to 64×64 pixels, 32-32 pixels, and 16×16 pixels and may determine the final division necessity/nonnecessity probability value using machine learning. Note that the machine learning may be constituted by CNN or other such neural network.

With the configuration described above. CNN calculation information of a lower layer can be used in the division necessity/nonnecessity determination of an upper layer, and the block division accuracy can be further increased.

Fifth Embodiment

The fifth embodiment will be described below. The difference between this embodiment and the third embodiment lies in the method of calculating loss_sum when learning. loss_sum may not be obtained by simply summation of the division necessity/nonnecessity of the elements.

As described above, the smaller the blocks, the more difficult it is to increase accuracy. In the present embodiment, the loss for blocks of 16×16 pixels is more heavily weighted when loss_sum is calculated.

In the present embodiment, $$\text{loss\_sum} = \alpha \times \Sigma \text{loss}64[0] + \beta \times \Sigma \text{loss}32[j] + \gamma \times \Sigma \text{loss}16[k] \quad (2)$$

$$\alpha \leq \beta \leq \gamma \quad (3)$$

Here, $0 \leq j \leq 3$ holds true, however a j that does not exist is not included in the calculation.

Also, $0 \leq k \leq 15$ holds true, however a k that does not exist is not included in the calculation.

With the configuration described above, learning relating to elements for which accuracy is difficult to increase can be selectively executed, and block division accuracy can be further increased.

Note that once learning is performed, elements for which accuracy is difficult to increase may be searched for, and the relationship between $\alpha$, $\beta$, and $\gamma$ may be determined on the basis of experience and is not limited to the relationship of Formula (3).

Some embodiments have been described above in detail. However, the present invention is not limited to these specific embodiments, and various changes and modifications can be made without departing from the scope of the claims. Also, all or some of the components of the embodiments described above can be combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-046841, filed Mar. 17, 2020, which is hereby incorporated by reference herein in its entirety.

What is claimed is:

1. A division pattern determining apparatus, comprising:
a determining unit configured to determine a division pattern for dividing a region to be encoded in image data using a neural network; and
a dividing unit configured to divide the region to be encoded in the image data into one or more blocks according to the division pattern determined by the determining unit,
wherein the neural network comprises first processing layer including one or more convolutional layers, a first division-determination layer to which output from the first processing layer is input, the first division-determination layer including one or more convolutional layers, a second processing layer to which the output from the first processing layer is input, the second processing layer including one or more convolutional layers, a second division-determination layer which output from the second processing layer is input, the second division-determination layer including one or more convolutional layers, and a third division-determination layer to which the output from the second processing layer is input, the third division-determination layer including one or more convolutional layers,
the first division-determination layer outputs information for determining whether or not to divide an image region having a first block size into a second block size,
the second division-determination layer outputs information for determining whether or not to divide an image region having the second block size into a third block size,
the third division-determination layer outputs information for determining whether or not to divide an image region having the third block size into a fourth block size, and
the first block size is larger than the second block size, the second block size is larger than the third block size, and the third block size is larger than the fourth block size.

2. The apparatus according to claim 1, wherein the second processing layer includes a pooling layer to which the output from the first processing layer is input.

3. The apparatus according to claim 2, wherein the third division-determination layer includes a pooling layer to which the output from the second processing layer is input.

4. The apparatus according to claim 1, wherein the first division-determination layer includes a first fully connected layer to which output from a convolutional layer included therein is input, and the first fully connected layer outputs the information for determining whether or not to divide the image region having the first block size into the second block size.

5. The apparatus according to claim 1, wherein the second division-determination layer includes a second fully connected layer to which output from a convolutional layer included therein is input, and the second fully connected layer outputs the information for determining whether or not to divide the image region having the second block size into the third block size.

6. The apparatus according to claim 1, wherein the third division-determination layer includes a third fully connected layer to which output from a convolutional layer included therein is input, and the third fully connected layer outputs the information for determining whether or not to divide the image region having the third block size into the fourth block size.

7. The apparatus according to claim 1, wherein the region to be encoded is a coding tree unit (CTU).

8. The apparatus according to claim 7, wherein the size of the block includes a size represented by the CTU, a size of a coding unit (CU) included in the CTU, and a size of a prediction unit (PU) or a transform unit (TU) included in the CU.

9. The apparatus according to claim 1, further comprising an encoding unit configured to execute intra-encoding or inter-encoding on a target block divided by the dividing unit.

10. A method of controlling a division pattern determining apparatus, comprising:
  determining a division pattern for dividing a region to be encoded in image data using a neural network; and
  dividing the region to be encoded in the image data into one or more blocks according to the division pattern,
  wherein the neural network comprises first processing layer including one or more convolutional layers, a first division-determination layer to which output from the first processing layer is input, the first division-determination layer including one or more convolutional layers, a second processing layer to which the output from the first processing layer is input, the second processing layer including one or more convolutional layers, a second division-determination layer to which output from the second processing layer is input, the second division-determination layer including one or more convolutional layers, and a third division-determination layer to which the output from the second processing layer is input, the third division-determination layer including one or more convolutional layers,
  the first division-determination layer outputs information for determining whether or not to divide an image region having a first block size into a second block size,
  the second division-determination layer outputs information for determining whether or not to divide an image region having the second block size into a third block size,
  the third division-determination layer outputs information for determining whether or not to divide an image region having the third block size into a fourth block size, and
  the first block size is larger than the second block size, the second block size is larger than the third block size, and the third block size is larger than the fourth block size.

11. A non-transitory computer-readable storage medium storing a program which, when read and executed by a computer, causes the computer to execute steps of a method of controlling a division pattern determining apparatus, the method comprising:
  determining a division pattern for dividing a region to be encoded in image data using a neural network; and
  dividing the region to be encoded in the image data into one or more blocks according to the division pattern,
  wherein the neural network comprises first processing layer including one or more convolutional layers, a first division-determination layer to which output from the first processing layer is input, the first division-determination layer including one or more convolutional layers, a second processing layer to which the output from the first processing layer is input, the second processing layer including one or more convolutional layers, a second division-determination layer to which output from the second processing layer is input, the second division-determination layer including one or more convolutional layers, and a third division-determination layer to which the output from the second processing layer is input, the third division-determination layer including one or more convolutional layers,
  the first division-determination layer outputs information for determining whether or not to divide an image region having a first block size into a second block size,
  the second division-determination layer outputs information for determining whether or not to divide an image region having the second block size into a third block size,
  the third division-determination layer outputs information for determining whether or not to divide an image region having the third block size into a fourth block size, and
  the first block size is larger than the second block size, the second block size is larger than the third block size, and the third block size is larger than the fourth block size
  executing on the image data of the region to be encoded a determination for a plurality of blocks of different sizes whether or not to divide each block using a neural network and determine a division pattern of one or more blocks included in the region to be encoded on the basis of the determination,
  wherein the neural network used in the executing is constituted by a plurality of layers; and
  wherein when a size of a block for which whether or not to divide is to be determined is large, information from an intermediate layer positioned in an upper position is used.

* * * * *